(12) United States Patent
Zhang

(10) Patent No.: US 11,844,092 B2
(45) Date of Patent: Dec. 12, 2023

(54) SEARCH SPACE DETERMINING METHOD AND WIRELESS APPARATUS

(71) Applicant: HUAWEI TECHNOLOGIES CO., LTD., Guangdong (CN)

(72) Inventor: Xu Zhang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 9 days.

(21) Appl. No.: 17/830,956

(22) Filed: Jun. 2, 2022

(65) Prior Publication Data

US 2022/0295462 A1    Sep. 15, 2022

Related U.S. Application Data

(63) Continuation of application No. 16/690,414, filed on Nov. 21, 2019, now Pat. No. 11,382,085, which is a
(Continued)

(30) Foreign Application Priority Data

Nov. 10, 2017  (CN) .......................... 201711108175.4

(51) Int. Cl.
*H04W 72/04* (2023.01)
*H04W 72/23* (2023.01)
*H04W 48/08* (2009.01)

(52) U.S. Cl.
CPC ........... *H04W 72/23* (2023.01); *H04W 48/08* (2013.01)

(58) Field of Classification Search
CPC ..... H04W 72/23; H04W 48/08; H04W 48/12; H04W 72/04; H04L 5/0053; H04L 27/26
See application file for complete search history.

(56) References Cited

U.S. PATENT DOCUMENTS

2013/0194931 A1    8/2013   Lee et al.
2015/0237624 A1*   8/2015   Tang ................. H04W 72/0446
                                                              370/329
(Continued)

FOREIGN PATENT DOCUMENTS

CN        103874096 A      6/2014
CN        104221407 A     12/2014
(Continued)

OTHER PUBLICATIONS

Huawei et al., "CORESET configuration and search space design",3GPP TSG RAN WG1 Meeting #91 R1-1719387,Reno, USA, Nov. 27 Dec. 1, 2017,total 14 pages.
(Continued)

*Primary Examiner* — John D Blanton
(74) *Attorney, Agent, or Firm* — WOMBLE BOND DICKINSON (US) LLP

(57) ABSTRACT

This application discloses a search space determining method of a wireless apparatus, relates to the field of communications technologies, and is used to resolve a problem that an existing search space determining method cannot be applied to a future evolved network. The method includes: obtaining a second parameter, and a first parameter corresponding to a control resource set, where the first parameter is a positive integer not equal to 39827, 39829, and 65537, and the second parameter is equal to 65537 or is a prime number not equal to 65537; and determining a search space of the control resource set based on the first parameter and the second parameter. This application is applicable to a search space determining process.

20 Claims, 4 Drawing Sheets

Related U.S. Application Data continuation of application No. PCT/CN2018/115093, filed on Nov. 12, 2018.

(56) References Cited

U.S. PATENT DOCUMENTS

| | | | |
|---|---|---|---|
| 2015/0245330 A1 | 8/2015 | Sartori et al. | |
| 2016/0119946 A1 | 4/2016 | Dai et al. | |
| 2017/0171842 A1 | 6/2017 | You et al. | |
| 2017/0230994 A1 | 8/2017 | You et al. | |
| 2019/0246397 A1 | 8/2019 | Tang | |
| 2020/0007295 A1* | 1/2020 | Kwak | H04L 5/0053 |
| 2020/0163062 A1* | 5/2020 | Takeda | H04W 8/24 |
| 2020/0236699 A1* | 7/2020 | Nakashima | H04L 5/0094 |

FOREIGN PATENT DOCUMENTS

| | | |
|---|---|---|
| EP | 2911456 A1 | 8/2015 |
| KR | 1020140126345 A | 10/2014 |
| WO | 2014067124 A1 | 5/2014 |
| WO | 2019031580 A1 | 2/2019 |
| WO | WO-2019031580 A1 * | 2/2019 ............... H04J 1/00 |

OTHER PUBLICATIONS

Intel Corporation, CORESETs and search spaces in NR. 3GPP TSG RAN WG1 #91bis, Prague, Czech Republic, Oct 9 13, 2017, R1-1717379, 11 pages.

Samsung, "On Search Space Design",3GPP TSG RAN WG1 Meeting 90bis R1-1717642,Prague, CZ, Oct. 9 13, 2017,total 8 pages.

* cited by examiner

SEARCH SPACE DETERMINING METHOD AND WIRELESS APPARATUS

CROSS-REFERENCE TO RELATED APPLICATIONS

This application is a continuation of U.S. patent application Ser. No. 16/690,414, filed on Nov. 21, 2019, which is a continuation of International Application No. PCT/CN2018/115093, filed on Nov. 12, 2018, which claims priority to Chinese Patent Application No. 201711108175.4, filed on Nov. 10, 2017. All of the afore-mentioned patent applications are hereby incorporated by reference in their entireties.

TECHNICAL FIELD

This application relates to the field of communications technologies, and in particular, to a search space determining method and a wireless apparatus.

BACKGROUND

In a Long Term Evolution (LTE) system, a terminal device receives downlink control signaling (DCI) by using a physical downlink control channel (PDCCH). The DCI is used to instruct the terminal device to receive downlink data, send uplink data, adjust transmit power, and the like.

A network device configures a control resource set for the terminal device, and the control resource set includes a control channel element (CCE) used to form the PDCCH. The terminal device determines a search space in the control resource set, and the search space is a set of candidate PDCCHs, and the terminal device detects, in the search space, the PDCCH used to transmit the DCI.

Currently, an existing search space determining method is mainly applicable to a scenario in which the network device configures one or two control resource sets for the terminal device, and a quantity of terminal devices is limited. In a future evolved network, the network device may configure more than two control resource sets for the terminal device, and the quantity of terminal devices may be larger. Therefore, the existing search space determining method cannot be applied to the future evolved network.

SUMMARY

This application provides a search space determining method and a wireless apparatus, to resolve a problem that an existing search space determining method cannot be applied to a future evolved network.

To achieve the foregoing objectives, the following technical solutions are used in this application:

According to a first aspect, this application provides a search space determining method of a wireless apparatus, where the method includes: obtaining a second parameter, and a first parameter corresponding to a control resource set, where the first parameter is a positive integer not equal to 39827, 39829, and 65537, and the second parameter is equal to 65537 or is a prime number not equal to 65537; and determining a search space of the control resource set based on the first parameter and the second parameter.

In this way, because the first parameter is an integer not equal to 39827, 39829, and 65537, and the second parameter is equal to 65537 or is a prime number not equal to 65537, the first parameter and the second parameter are values other than values (namely, 39827, 39829, and 65537) limited by a current network, so that the values of the first parameter and the second parameter are adapted to evolution of a future network, thereby reducing a probability of control channel congestion in the search space while meeting various demands in the future network.

In one embodiment of the first aspect, the method further includes: obtaining a number of the control resource set. The obtaining a first parameter corresponding to a control resource set includes: determining the first parameter based on the number of the control resource set. Therefore, the wireless apparatus can obtain the first parameter corresponding to the control resource set.

In one embodiment of the first aspect, the determining the parameter based on the number of the control resource set includes: determining, based on a preset correspondence, the first parameter corresponding to the number of the control resource set. The preset correspondence includes the number of the control resource set and the first parameter corresponding to the number of the control resource set. For example, the number of the control resource set may be 0, 1, 2, 3, or the like.

In one embodiment, the first parameter is 39839.

In one embodiment, the first parameter is one element in a first set, and the first set includes at least one of {39798, 39805, 39806, 39807, 39808, 39813, 39815, 39816, 39819, 39821, 39824, 39828, 39830, 39832, 39839, 39840, 39842, 39850, 39853, 39854, 39855, 39856, 39858, 39859, 39735, 39736, 39740, 39743, 39745, 39748, 39753, 39755, 39756, 39757, 39759, 39761, 39764, 39765, 39768, 39771, 39775, 39777, 39779, 39780, 39782, 39783, 39784, 39786, 39787, 39789, 39790, 39791, 39794, 39674, 39675, 39676, 39681, 39683, 39684, 39685, 39686, 39688, 39689, 39690, 39692, 39693, 39695, 39697, 39700, 39701, 39704, 39707, 39708, 39709, 39712, 39713, 39714, 39716, 39718, 39720, 39722, 39723, 39725, 39727, 39730, 39731, 39733, 39618, 39625, 39627, 39628, 39630, 39631, 39632, 39633, 39636, 39637, 39642, 39644, 39647, 39648, 39650, 39651, 39652, 39654, 39655, 39656, 39657, 39658, 39659, 39660, 39664, 39666, 39667, 39671, 39672, 39673, 38317, 38329, 38371, 38393, 38447, 38461, 38543, 38557, 38561, 38603, 38609, 38611, 38629, 38639, 38651, 38677, 38693, 38707, 38711, 38713, 38737, 38747, 38803, 38821, 38861, 38873, 38933, 38953, 38959, 38971, 39041, 39043, 39079, 39107, 39133, 39139, 40193, 40231, 40289, 40343, 40357, 40361, 40429, 40493, 40583, 40597, 40609, 40693, 40697, 40709, 40771, 40801, 40813, 40819, 40823, 40841, 40847, 40849, 40853, 40867, 40879, 40897, 40903, 39157, 39163, 39181, 39199, 39209, 39217, 39229, 39239, 39241, 39301, 39317, 39323, 39343, 39383, 39409, 39419, 39451, 39499, 39509, 39541, 39563, 39569, 39581, 39631, 39659, 39667, 39671, 39709, 39727, 39733, 39761, 39779, 39791, 39821, 39839, 39863, 39887, 39901, 39971, 39979, 39983, 39989, 40087, 40093, 40123, 40127, 40129, 40153, 40169, 40177}.

Alternatively, the first parameter is a prime number that is not equal to 39827, 39829, and 65537. In addition, when the first parameter is a prime number that is not equal to 39827, 39829, and 65537, the first set includes at least one of {39671, 39709, 39727, 39733, 39761, 39779, 39791, 39821, 39839, 39863, 39887, 39901, 39971, 39979, 39983, 39989, 40087, 40093, 40123, 40127, 40129, 40153, 40169, 40177, 38317, 38329, 38371, 38393, 38447, 38461, 38543, 38557, 38561, 38603, 38609, 38611, 38629, 38639, 38651, 38677, 38693, 38707, 38711, 38713, 38737, 38747, 38803, 38821, 38861, 38873, 38933, 38953, 38959, 38971, 39041, 39043, 39079, 39107, 39133, 39139, 40193, 40231, 40289, 40343, 40357, 40361, 40429, 40493, 40583, 40597, 40609, 40693, 40697, 40709, 40771, 40801, 40813, 40819, 40823, 40841, 40847, 40849, 40853, 40867, 40879, 40897, 40903, 39157, 39163, 39181, 39199, 39209, 39217, 39229, 39239, 39241, 39301, 39317, 39323, 39343, 39383, 39409, 39419, 39451, 39499, 39509, 39541, 39563, 39569, 39581, 39631, 39659, 39667}.

In one embodiment, the second parameter is one element in a second set, and the second set includes at least one of {524309, 524341, 524347, 524351, 524353, 524369, 524387, 524389, 524411, 524413, 524429, 524453, 524497, 524507, 524509, 524519, 524521, 524591, 524593, 524599, 524633, 524669, 524681, 524683, 524701, 262147, 262151, 262153, 262187, 262193, 262217, 262231, 262237, 262253, 262261, 262271, 262303, 262313, 262321, 262331, 262337, 262349, 262351, 262369, 262387, 262391, 262399, 262411, 262433, 262459, 131071, 131101, 131111, 131113, 131129, 131143, 131149, 131171, 131203, 131213, 131221, 131231, 131249, 131251, 131267, 131293, 131297, 131303, 131311, 131317, 131321, 131357, 131363, 131371, 131381, 1048583, 1048589, 1048601, 1048609, 1048613, 1048627, 1048633, 1048661, 1048681, 1048703, 1048709, 1048717, 1048721, 1048759, 1048783, 1048793, 1048799, 1048807, 1048829, 1048837, 1048847, 1048867, 1048877, 1048889, 1048891, 2097169, 2097211, 2097223, 2097229, 2097257, 2097259, 2097287, 2097289, 2097311, 2097317, 2097349, 2097373, 2097383, 2097397, 2097401, 2097421, 2097427, 2097449, 2097451, 2097461, 2097479, 2097481, 2097499, 2097503, 297517}.

In one embodiment, the first parameter is one element in the first set, and a third parameter is predefined by a system or indicated by higher layer signaling. The first parameter meets the following relationship: $A=(A'^q) \bmod D$, where A represents the first parameter, D represents the second parameter, A' represents the third parameter, and q is an integer that is mutually prime to D−1.

In one embodiment of the first aspect, the third parameter A'=39827 is predefined, and then the first parameter A is determined based on $A=(A'^q) \bmod D$, where D represents the second parameter, and q is an integer that is mutually prime to D−1.

In one embodiment, the first parameter is one element in the first set, and the first set further includes the third parameter. The first parameter meets the following relationship: $A=(A'^q) \bmod D$ where A represents the first parameter, D represents the second parameter, A' represents the third parameter, and q is an integer that is mutually prime to D−1.

In one embodiment of the first aspect, the determining a search space of the control resource set based on the first parameter and the second parameter includes: determining, based on a formula $Y_k=(A*Y_{k-1}) \bmod D$, the search space corresponding to the control resource set, where k represents a number of a time unit, $Y_k$ represents a variable corresponding to the time unit k, $Y_{k-1}$ represents a variable corresponding to a time unit k−1, A represents the first parameter, and D represents the second parameter.

In one embodiment, the control resource set is one of M control resource sets configured for a terminal device, M is less than or equal to Q, and Q is a maximum quantity of control resource sets configurable for the terminal device.

In one embodiment of the first aspect, before the obtaining a second parameter, and a first parameter corresponding to a control resource set, the method further includes: receiving system information, where the system information is used to indicate Q. In one embodiment of the first aspect, before the obtaining a second parameter, and a first parameter corresponding to a control resource set, the method further includes: sending system information, where the system information is used to indicate Q.

In one embodiment of the first aspect, the obtaining a number of the control resource set includes: receiving radio resource control signaling, where the radio resource control signaling includes the number of the control resource set. Therefore, when the wireless apparatus is a terminal device, the terminal device can obtain the number of the control resource set.

In one embodiment of the first aspect, after the obtaining a number of the control resource set, the method further includes: sending radio resource control signaling, where the radio resource control signaling includes the number of the control resource set. Therefore, when the wireless apparatus is an access network device, the access network device can send the number of the control resource set to a terminal.

In one embodiment of the first aspect, after the determining a search space of the control resource set based on the first parameter and the second parameter, the method further includes: detecting at least one candidate control channel in the search space to obtain control information. Therefore, when the wireless apparatus is a terminal device, the terminal device can obtain the control information.

In one embodiment of the first aspect, after the determining a search space of the control resource set based on the first parameter and the second parameter, the method further includes: sending control information on one or more candidate control channels in the search space. Therefore, when the wireless apparatus is an access network device, the access network device can send the control information to the terminal device.

According to a second aspect, this application provides a wireless apparatus, including a processor and a memory coupled to the processor, where the processor is configured to obtain a second parameter, and a first parameter corresponding to a control resource set, where the first parameter is a positive integer not equal to 39827, 39829, and 65537, and the second parameter is equal to 65537 or is a prime number not equal to 65537. The processor is further configured to determine a search space of the control resource set based on the first parameter and the second parameter. In one embodiment of the second aspect, the processor is further configured to obtain a number of the control resource set. The processor is configured to obtain, in the following manner, the first parameter corresponding to the control resource set: determining, based on the number of the control resource set, the first parameter corresponding to the control resource set.

In one embodiment of the second aspect, the processor is configured to determine, in the following manner and based on the number of the control resource set, the first parameter corresponding to the control resource set: determining, based on a preset correspondence, the first parameter corresponding to the number of the control resource set. The preset correspondence includes the number of the control resource set and the first parameter corresponding to the number of the control resource set.

In one embodiment, the first parameter is 39839.

In one embodiment, the first parameter is one element in a first set, and the first set includes at least one of {39798, 39805, 39806, 39807, 39808, 39813, 39815, 39816, 39819, 39821, 39824, 39828, 39830, 39832, 39839, 39840, 39842, 39850, 39853, 39854, 39855, 39856, 39858, 39859, 39735, 39736, 39740, 39743, 39745, 39748, 39753, 39755, 39756, 39757, 39759, 39761, 39764, 39765, 39768, 39771, 39775, 39777, 39779, 39780, 39782, 39783, 39784, 39786, 39787, 39789, 39790, 39791, 39794, 39674, 39675, 39676, 39681, 39683, 39684, 39685, 39686, 39688, 39689, 39690, 39692, 39693, 39695, 39697, 39700, 39701, 39704, 39707, 39708, 39709, 39712, 39713, 39714, 39716, 39718, 39720, 39722, 39723, 39725, 39727, 39730, 39731, 39733, 39618, 39625, 39627, 39628, 39630, 39631, 39632, 39633, 39636, 39637, 39642, 39644, 39647, 39648, 39650, 39651, 39652, 39654, 39655, 39656, 39657, 39658, 39659, 39660, 39664, 39666, 39667, 39671, 39672, 39673, 38317, 38329, 38371, 38393, 38447, 38461, 38543, 38557, 38561, 38603, 38609, 38611, 38629, 38639, 38651, 38677, 38693, 38707, 38711, 38713, 38737, 38747, 38803, 38821, 38861, 38873, 38933, 38953, 38959, 38971, 39041, 39043, 39079, 39107, 39133, 39139, 40193, 40231, 40289, 40343, 40357, 40361, 40429, 40493, 40583, 40597, 40609, 40693, 40697, 40709, 40771, 40801, 40813, 40819, 40823, 40841, 40847, 40849, 40853, 40867, 40879, 40897, 40903, 39157, 39163, 39181, 39199, 39209, 39217, 39229, 39239, 39241, 39301, 39317, 39323, 39343, 39383, 39409, 39419, 39451, 39499, 39509, 39541, 39563, 39569, 39581, 39631, 39659, 39667, 39671, 39709, 39727, 39733, 39761, 39779, 39791, 39821, 39839, 39863, 39887, 39901, 39971, 39979, 39983, 39989, 40087, 40093, 40123, 40127, 40129, 40153, 40169, 40177}.

Alternatively, the first parameter is a prime number that is not equal to 39827, 39829, and 65537. In addition, when the first parameter is a prime number that is not equal to 39827, 39829, and 65537, the first set includes at least one of {39671, 39709, 39727, 39733, 39761, 39779, 39791, 39821, 39839, 39863, 39887, 39901, 39971, 39979, 39983, 39989, 40087, 40093, 40123, 40127, 40129, 40153, 40169, 40177, 38317, 38329, 38371, 38393, 38447, 38461, 38543, 38557, 38561, 38603, 38609, 38611, 38629, 38639, 38651, 38677, 38693, 38707, 38711, 38713, 38737, 38747, 38803, 38821, 38861, 38873, 38933, 38953, 38959, 38971, 39041, 39043, 39079, 39107, 39133, 39139, 40193, 40231, 40289, 40343, 40357, 40361, 40429, 40493, 40583, 40597, 40609, 40693, 40697, 40709, 40771, 40801, 40813, 40819, 40823, 40841, 40847, 40849, 40853, 40867, 40879, 40897, 40903, 39157, 39163, 39181, 39199, 39209, 39217, 39229, 39239, 39241, 39301, 39317, 39323, 39343, 39383, 39409, 39419, 39451, 39499, 39509, 39541, 39563, 39569, 39581, 39631, 39659, 39667}.

In one embodiment, the second parameter is one element in a second set, and the second set includes at least one of {524309, 524341, 524347, 524351, 524353, 524369, 524387, 524389, 524411, 524413, 524429, 524453, 524497, 524507, 524509, 524519, 524521, 524591, 524593, 524599, 524633, 524669, 524681, 524683, 524701, 262147, 262151, 262153, 262187, 262193, 262217, 262231, 262237, 262253, 262261, 262271, 262303, 262313, 262321, 262331, 262337, 262349, 262351, 262369, 262387, 262391, 262399, 262411, 262433, 262459, 131071, 131101, 131111, 131113, 131129, 131143, 131149, 131171, 131203, 131213, 131221, 131231, 131249, 131251, 131267, 131293, 131297, 131303, 131311, 131317, 131321, 131357, 131363, 131371, 131381, 1048583, 1048589, 1048601, 1048609, 1048613, 1048627, 1048633, 1048661, 1048681, 1048703, 1048709, 1048717, 1048721, 1048759, 1048783, 1048793, 1048799, 1048807, 1048829, 1048837, 1048847, 1048867, 1048877, 1048889, 1048891, 2097169, 2097211, 2097223, 2097229, 2097257, 2097259, 2097287, 2097289, 2097311, 2097317, 2097349, 2097373, 2097383, 2097397, 2097401, 2097421, 2097427, 2097449, 2097451, 2097461, 2097479, 2097481, 2097499, 2097503, 297517}.

In one embodiment, the first parameter is one element in the first set, and a third parameter is predefined by a system or indicated by higher layer signaling. The first parameter meets the following relationship: $A=(A'^q) \bmod D$, where A represents the first parameter, D represents the second parameter, A' represents the third parameter, and q is an integer that is mutually prime to D−1.

In one embodiment of the second aspect, the third parameter A'=39827 is predefined, and then the first parameter A is determined based on $A=(A'^q) \bmod D$, where D represents the second parameter, and q is an integer that is mutually prime to D−1.

In one embodiment, the first parameter is one element in the first set, and the first set further includes the third parameter. The first parameter meets the following relationship: $A=(A'^q) \bmod D$ where A represents the first parameter, D represents the second parameter, A' represents the third parameter, and q is an integer that is mutually prime to D−1.

In one embodiment of the second aspect, the processor is configured to determine the search space of the control resource set based on the first parameter and the second parameter in the following manner: determining, based on a formula $Y_k=(A*Y_{k-1}) \bmod D$, the search space corresponding to the control resource set, where k represents a number of a time unit, $Y_k$ represents a variable corresponding to the time unit k, $Y_{k-1}$ represents a variable corresponding to a time unit k−1, A represents the first parameter, and D represents the second parameter.

In one embodiment, the control resource set is one of M control resource sets configured for a terminal device, M is less than or equal to Q, and Q is a maximum quantity of control resource sets configurable for the terminal device.

In one embodiment of the second aspect, the wireless apparatus further includes a transceiver, configured to receive system information, where the system information is used to indicate Q.

In one embodiment of the second aspect, the wireless apparatus further includes a transceiver, configured to send system information, where the system information is used to indicate Q.

In one embodiment of the second aspect, the wireless apparatus further includes a transceiver, configured to receive radio resource control signaling, where the radio resource control signaling includes the number of the control resource set.

In one embodiment of the second aspect, the wireless apparatus further includes a transceiver, configured to send radio resource control signaling, where the radio resource control signaling includes the number of the control resource set.

In one embodiment of the second aspect, the wireless apparatus further includes a transceiver, configured to detect at least one candidate control channel in the search space to obtain control information.

In one embodiment of the second aspect, the wireless apparatus further includes a transceiver, configured to send control information on one or more candidate control channels in the search space.

According to a third aspect, this application provides a wireless apparatus, including: a communications unit, configured to obtain a second parameter, and a first parameter corresponding to a control resource set, where the first parameter is a positive integer not equal to 39827, 39829, and 65537, and the second parameter is equal to 65537 or is a prime number not equal to 65537; and a processing unit, configured to determine a search space of the control resource set based on the first parameter and the second parameter.

In one embodiment of the third aspect, the communications unit is further configured to obtain a number of the control resource set, and the processing unit is further configured to determine the first parameter based on the number of the control resource set.

In one embodiment of the third aspect, the processing unit is configured to determine, based on a preset correspondence, the first parameter corresponding to the number of the control resource set, where the preset correspondence includes the number of the control resource set and the first parameter corresponding to the number of the control resource set.

In one embodiment, the first parameter is one element in a first set, and the first set includes at least one of {39798, 39805, 39806, 39807, 39808, 39813, 39815, 39816, 39819, 39821, 39824, 39828, 39830, 39832, 39839, 39840, 39842, 39850, 39853, 39854, 39855, 39856, 39858, 39859, 39735, 39736, 39740, 39743, 39745, 39748, 39753, 39755, 39756, 39757, 39759, 39761, 39764, 39765, 39768, 39771, 39775, 39777, 39779, 39780, 39782, 39783, 39784, 39786, 39787, 39789, 39790, 39791, 39794, 39674, 39675, 39676, 39681, 39683, 39684, 39685, 39686, 39688, 39689, 39690, 39692, 39693, 39695, 39697, 39700, 39701, 39704, 39707, 39708, 39709, 39712, 39713, 39714, 39716, 39718, 39720, 39722, 39723, 39725, 39727, 39730, 39731, 39733, 39618, 39625, 39627, 39628, 39630, 39631, 39632, 39633, 39636, 39637, 39642, 39644, 39647, 39648, 39650, 39651, 39652, 39654, 39655, 39656, 39657, 39658, 39659, 39660, 39664, 39666, 39667, 39671, 39672, 39673, 38317, 38329, 38371, 38393, 38447, 38461, 38543, 38557, 38561, 38603, 38609, 38611, 38629, 38639, 38651, 38677, 38693, 38707, 38711, 38713, 38737, 38747, 38803, 38821, 38861, 38873, 38933, 38953, 38959, 38971, 39041, 39043, 39079, 39107, 39133, 39139, 40193, 40231, 40289, 40343, 40357, 40361, 40429, 40493, 40583, 40597, 40609, 40693, 40697, 40709, 40771, 40801, 40813, 40819, 40823, 40841, 40847, 40849, 40853, 40867, 40879, 40897, 40903, 39157, 39163, 39181, 39199, 39209, 39217, 39229, 39239, 39241, 39301, 39317, 39323, 39343, 39383, 39409, 39419, 39451, 39499, 39509, 39541, 39563, 39569, 39581, 39631, 39659, 39667, 39671, 39709, 39727, 39733, 39761, 39779, 39791, 39821, 39839, 39863, 39887, 39901, 39971, 39979, 39983, 39989, 40087, 40093, 40123, 40127, 40129, 40153, 40169, 40177}.

Alternatively, the first parameter is a prime number that is not equal to 39827, 39829, and 65537. In addition, when the first parameter is a prime number that is not equal to 39827, 39829, and 65537, the first set includes at least one of {39671, 39709, 39727, 39733, 39761, 39779, 39791, 39821, 39839, 39863, 39887, 39901, 39971, 39979, 39983, 39989, 40087, 40093, 40123, 40127, 40129, 40153, 40169, 40177, 38317, 38329, 38371, 38393, 38447, 38461, 38543, 38557, 38561, 38603, 38609, 38611, 38629, 38639, 38651, 38677, 38693, 38707, 38711, 38713, 38737, 38747, 38803, 38821, 38861, 38873, 38933, 38953, 38959, 38971, 39041, 39043, 39079, 39107, 39133, 39139, 40193, 40231, 40289, 40343, 40357, 40361, 40429, 40493, 40583, 40597, 40609, 40693, 40697, 40709, 40771, 40801, 40813, 40819, 40823, 40841, 40847, 40849, 40853, 40867, 40879, 40897, 40903, 39157, 39163, 39181, 39199, 39209, 39217, 39229, 39239, 39241, 39301, 39317, 39323, 39343, 39383, 39409, 39419, 39451, 39499, 39509, 39541, 39563, 39569, 39581, 39631, 39659, 39667}.

In one embodiment, the second parameter is one element in a second set, and the second set includes at least one of {524309, 524341, 524347, 524351, 524353, 524369, 524387, 524389, 524411, 524413, 524429, 524453, 524497, 524507, 524509, 524519, 524521, 524591, 524593, 524599, 524633, 524669, 524681, 524683, 524701, 262147, 262151, 262153, 262187, 262193, 262217, 262231, 262237, 262253, 262261, 262271, 262303, 262313, 262321, 262331, 262337, 262349, 262351, 262369, 262387, 262391, 262399, 262411, 262433, 262459, 131071, 131101, 131111, 131113, 131129, 131143, 131149, 131171, 131203, 131213, 131221, 131231, 131249, 131251, 131267, 131293, 131297, 131303, 131311, 131317, 131321, 131357, 131363, 131371, 131381, 1048583, 1048589, 1048601, 1048609, 1048613, 1048627, 1048633, 1048661, 1048681, 1048703, 1048709, 1048717, 1048721, 1048759, 1048783, 1048793, 1048799, 1048807, 1048829, 1048837, 1048847, 1048867, 1048877, 1048889, 1048891, 2097169, 2097211, 2097223, 2097229, 2097257, 2097259, 2097287, 2097289, 2097311, 2097317, 2097349, 2097373, 2097383, 2097397, 2097401, 2097421, 2097427, 2097449, 2097451, 2097461, 2097479, 2097481, 2097499, 2097503, 297517}.

In one embodiment, the first parameter is one element in the first set, and a third parameter is predefined by a system or indicated by higher layer signaling. The first parameter meets the following relationship: $A=(A'^q) \bmod D$, where A represents the first parameter, D represents the second parameter, A' represents the third parameter, and q is an integer that is mutually prime to D−1.

In one embodiment of the third aspect, the third parameter A'=39827 is predefined, and then the first parameter A is determined based on $A=(A'^q) \bmod D$, where D represents the second parameter, and q is an integer that is mutually prime to D−1.

In one embodiment, the first parameter is one element in the first set, and the first set further includes the third parameter. The first parameter meets the following relationship: $A=(A'^q) \bmod D$ where A represents the first parameter, D represents the second parameter, A' represents the third parameter, and q is an integer that is mutually prime to D−1.

In one embodiment of the third aspect, the processing unit is configured to determine, based on a formula $Y_k=(A*Y_{k-1}) \bmod D$, the search space corresponding to the control resource set, where k represents a number of a time unit, $Y_k$ represents a variable corresponding to the time unit k, $Y_{k-1}$ represents a variable corresponding to a time unit k−1, A represents the first parameter, and D represents the second parameter.

In one embodiment, the control resource set is one of M control resource sets configured for a terminal device, M is less than or equal to Q, and Q is a maximum quantity of control resource sets configurable for the terminal device.

In one embodiment of the third aspect, when the wireless apparatus is a terminal device, the communications unit is further configured to receive system information, where the system information is used to indicate Q.

In one embodiment of the third aspect, when the wireless apparatus is an access network device, the communications unit is further configured to send system information, where the system information is used to indicate Q.

In one embodiment of the third aspect, when the wireless apparatus is a terminal device, the communications unit is configured to receive radio resource control signaling, where the radio resource control signaling includes the number of the control resource set.

In one embodiment of the third aspect, when the wireless apparatus is an access network device, the communications unit is further configured to send radio resource control signaling, where the radio resource control signaling includes the number of the control resource set.

In one embodiment of the third aspect, when the wireless apparatus is a terminal device, the communications unit is further configured to detect at least one candidate control channel in the search space to obtain control information.

In one embodiment of the third aspect, when the wireless apparatus is an access network device, the communications unit is further configured to send control information on one or more candidate control channels in the search space.

According to a fourth aspect, this application provides a computer readable storage medium. The computer readable storage medium stores an instruction, and when the instruction runs on a wireless apparatus, the wireless apparatus is enabled to perform the search space determining method in any one the embodiments.

According to a fifth aspect, this application provides a computer program product that includes an instruction, and when the computer program product runs on a wireless apparatus, the wireless apparatus is enabled to perform the search space determining method in any one of the embodiments.

For beneficial effects corresponding to the second aspect to the fifth aspect, refer to related descriptions in the first aspect.

DESCRIPTION OF EMBODIMENTS

The following describes the technical solutions in the embodiments of this application with reference to the accompanying drawings in the embodiments of this application. It should be noted that the technical solutions or features in the embodiments of this application may be mutually combined in the case of no conflict.

Figure 1:
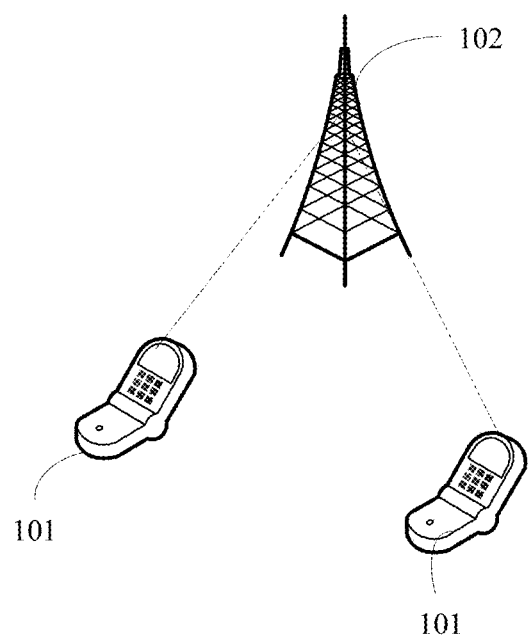
FIG. 1 is a schematic diagram of communication between a wireless device and a wireless communications system.

FIG. 1 is a schematic diagram of communication between a wireless device and a wireless communications system. The wireless communications system may be a system using various radio access technologies (RAT) such as code division multiple access (CDMA), time division multiple access (TDMA), frequency division multiple access (FDMA), orthogonal frequency division multiple access (OFDMA), or single carrier frequency division multiple access (SC-FDMA), and another system. For example, the wireless communications system may be a long term evolution system, a CDMA system, a wideband code division multiple access (WCDMA) system, a global system for mobile communications (GSM) system, a wireless local area network (WLAN) system, a new radio (NR) system, various evolved or converged systems, and a system oriented to a future communications technology. A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

For brevity, FIG. 1 shows communication between one network device 102 (for example, an access network device) and two wireless devices 101 (for example, terminal devices). Generally, the wireless communications system may include any quantity of network devices and terminal devices. The wireless communications system may further include one or more core network devices, a device configured to bear a virtualized network function, or the like. The access network device 102 may provide services for the wireless devices by using one or more carriers. In this application, the access network device and the terminal device are further collectively referred to as wireless apparatuses.

In this application, the access network device 102 is an apparatus that is deployed in a radio access network to provide a wireless communication function for the terminal devices. The access network device may include a macro base station (BS), a micro base station (also referred to as a small cell), a relay node, an access point, or the like in various forms. In systems that use different radio access technologies, names of a device that has a radio access function may be different. For example, in an LTE system, the device is referred to as an evolved NodeB (eNB or eNodeB), and in a 3rd generation (3G) system, the device is referred to as a NodeB, and the like. For ease of description, in this application, the device with the radio access function is referred to as an access network device, and is also referred to as a base station on some occasions. It should be noted that, in a 5G or NR system, there may be one or more transmission reception points (TRP) for one NR base station. All TRPs belong to a same cell, and each TRP and each terminal can use a method described in the embodiments of this application. In another scenario, the network device may further be divided into a control unit (CU) and a data unit (DU). There may be a plurality of DUs for one CU. Each DU and each terminal can use the method described in the embodiments of this application. A difference between a CU-DU separation scenario and a multi-TRP scenario lies in that, the TRP is merely one radio frequency unit or one antenna device, while the DU can implement a protocol stack function, for example, the DU can implement a physical layer function.

The wireless device in the embodiments of this application may include various handheld devices, vehicle-mounted devices, wearable devices, or computing devices that have a wireless communication function, or other processing devices connected to a wireless modem. The wireless device may be referred to as a terminal device, or may be referred to as a mobile station (MS), a terminal, user equipment (UE), or the like. The wireless device may communicate with one or more core networks through a radio access network (RAN). A wireless terminal may be a mobile terminal such as a mobile phone (also referred to as a "cellular" phone) or a computer with a mobile terminal. For example, the wireless terminal may be a portable, pocket-sized, handheld, computer built-in, or in-vehicle mobile apparatus that exchanges voice and/or data with the radio access network. For example, the wireless terminal may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, UE. The application is not limited thereto. For ease of description, these devices are referred to as terminal devices or UE in this application.

The wireless device may support one or more wireless technologies for wireless communication, such as 5G, LTE, WCDMA, CDMA, time division-synchronous code division multiple access (TS-SCDMA), GSM, and 802.11. The wireless device may also support a carrier aggregation technology.

A plurality of wireless devices may perform a same service or different services, for example, a mobile broadband service, an enhanced mobile broadband (eMBB) service, and a terminal device ultra-reliable and low latency communications (URLLC) service.

Figure 2:
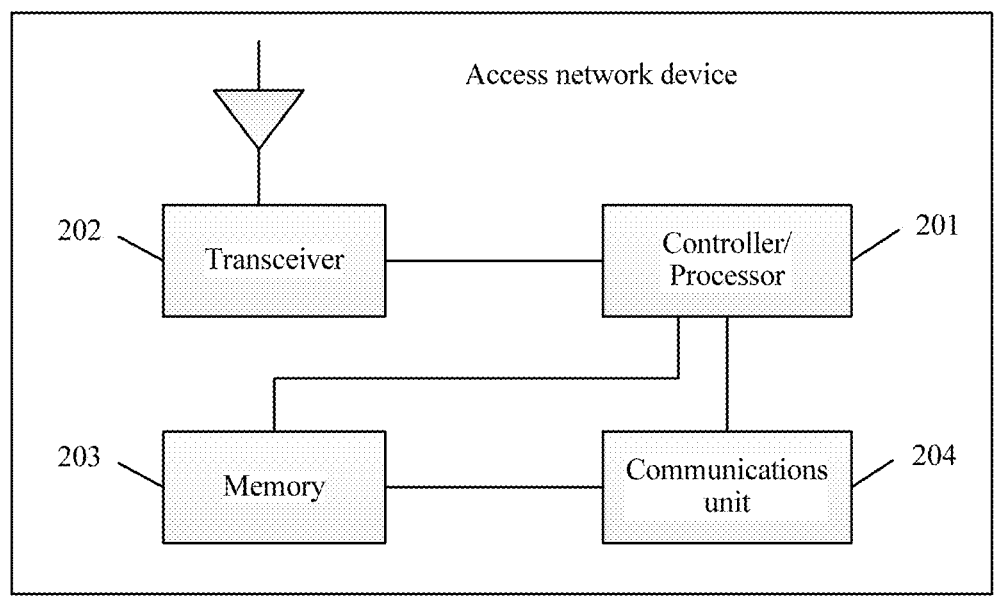
FIG. 2 is a schematic structural diagram of an access network device according to an embodiment of this application.

Further, a schematic structural diagram of the access network device 102 may be shown in FIG. 2. The access network device 102 can perform a method provided in this embodiment of this application. The access network device 102 may include a controller or a processor 201 (the processor 201 is used as an example below for description), and a transceiver 202. The controller/processor 201 is also referred to as a modem processor on some occasions. The modem processor 201 may include a baseband processor (BBP) (not shown). The baseband processor processes a received and digitized signal, to extract information or a data bit conveyed in the signal. In this way, as required or as expected, the BBP is usually implemented in one or more digital signal processors (DSP) in the modem processor 201, or is implemented as separate integrated circuits (IC).

The transceiver 202 may be configured to: support information receiving and sending between the access network device 102 and the terminal devices, and support radio communication between the terminal devices. The processor 201 may be further configured to perform a function of communication between various terminal devices and other network devices. In an uplink, an uplink signal from the terminal device is received by using an antenna, demodulated by the transceiver 202, and further processed by the processor 201, to restore service data and/or signaling information that are sent by the terminal device. In a downlink, service data and/or a signaling message are/is processed by the terminal device and modulated by the transceiver 202, to generate a downlink signal, and the downlink signal is transmitted to UE by using the antenna. The access network device 102 may further include a memory 203 that may be configured to store program code and/or data of the access network device 102. The transceiver 202 may include an independent receiver circuit and an independent transmitter circuit, or may be one circuit for implementing sending and receiving functions. The access network device 102 may further include a communications unit 204, configured to support communication between the access network device 102 and another network entity. For example, the communications unit 204 is configured to support communication between the access network device 102 and a network device in a core network, or the like.

In one embodiment, the access network device may further include a bus. The transceiver 202, the memory 203, and the communications unit 204 may be connected to the processor 201 by using the bus. For example, the bus may be a peripheral component interconnect (PCI) bus, an extended industry standard architecture (EISA) bus, or the like. The bus may include an address bus, a data bus, a control bus, and the like.

Figure 3:
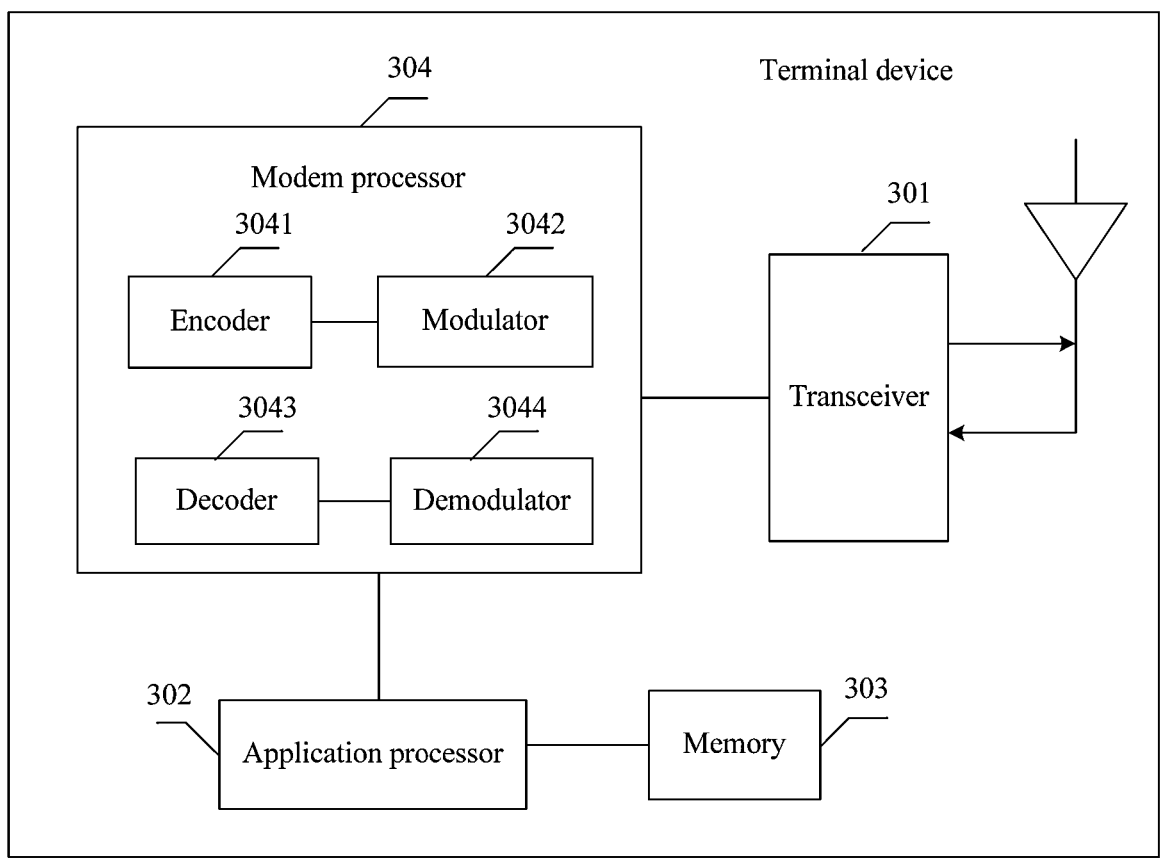
FIG. 3 is a schematic structural diagram of a terminal device according to an embodiment of this application.

FIG. 3 is a schematic structural diagram of a terminal device in the foregoing wireless communications system. The terminal device can perform the method provided in this embodiment of this application. The terminal device may be either of the two terminal devices 101. The terminal device includes a transceiver 301, an application processor 302, a memory 303, and a modem processor 304.

The transceiver 301 may adjust (for example, perform analog conversion, filtering, amplification, up-conversion, and the like) the output sample, and generate an uplink signal. The uplink signal is transmitted to the base station in the foregoing embodiment by using an antenna. In a downlink, the antenna receives a downlink signal transmitted by an access network device. The transceiver 301 may adjust (for example, perform filtering, amplification, down-conversion, digitization, and the like) a signal received from the antenna, and provide an input sample.

The modem processor 304 is also referred to as a controller or a processor on some occasions, and may include a baseband processor (BBP) (not shown). The baseband processor processes a received and digitized signal, to extract information or a data bit conveyed in the signal. As required or as expected, the BBP is usually implemented in one or more digital signal processors in the modem processor 304, or is implemented as separate integrated circuits (IC).

In one embodiment, the modem processor 304 may include an encoder 3041, a modulator 3042, a decoder 3043, and a demodulator 3044. The encoder 3041 is configured to encode a to-be-sent signal. For example, the encoder 3041 may be configured to: receive service data and/or a signaling message to be sent in an uplink, and process (for example, format, encode, or interleave) the service data and the signaling message. The modulator 3042 is configured to modulate an output signal of the encoder 3041. For example, the modulator may perform processing such as symbol mapping and/or modulation on the output signal (data and/or signaling) of the encoder, and provide an output sample. The demodulator 3044 is configured to perform demodulation processing on an input signal. For example, the demodulator 3044 processes the input sample and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling). The encoder 3041, the modulator 3042, the demodulator 3044, and the decoder 3043 may be implemented by a composite modem processor 304. These units process received data based on a radio access technology used in a radio access network.

The modem processor 304 receives, from the application processor 302, digitized data that may represent voice, data, or control information, and processes the digitized data for transmission. The modem processor may support one or more of a plurality of wireless communications protocols in a plurality of communications systems, such as LTE, new radio, universal mobile telecommunications system (UMTS), and high speed packet access (HSPA). In one embodiment, the modem processor 304 may further include one or more memories.

In one embodiment, the modem processor 304 and the application processor 302 may be integrated into one processor chip.

The memory 303 is configured to store program code (also referred to as a program, an instruction, software, or the like on some occasions) and/or data used to support communication of the terminal device.

It should be noted that the memory 203 or the memory 303 may include one or more storage units, for example, a storage unit, configured to store program code, inside the processor 201, the modem processor 304, or the application processor 302; a storage unit outside the processor 201, the modem processor 304, or the application processor 302; or a component that includes a storage unit inside the processor 201, the modem processor 304, or the application processor 302 or includes a storage unit outside the processor 201, the modem processor 304, or the application processor 302.

The processor 201 and the modem processor 301 may be processors of a same type, or may be processors of different types. For example, the processor 201 and the modem processor 304 may be implemented in a central processing unit (CPU), a general purpose processor, a digital signal processor (DSP), an application-specific integrated circuit (ASIC), a field programmable gate array (FPGA) or another programmable logic device, a transistor logic device, a hardware component, another integrated circuit, or any combination thereof. The processor 201 and the modem processor 301 may implement or execute various example logic blocks, modules, and circuits described with reference to the content disclosed in the embodiments of this application. Alternatively, the processor may be a combination of components that implement a computing function, for example, a combination including one or more microprocessors, a combination of a DSP and a microprocessor, a system-on-a-chip (SOC), or the like.

Before the method provided in the embodiments of this application is described, related terms in the embodiments of this application are briefly described first.

A control channel includes one or more CCEs and is used to carry control information, for example, includes a PDCCH.

A size of an aggregation level of the control channel corresponds to a quantity of CCEs that constitute the control channel. For example, an aggregation level of the PDCCH is a quantity of CCEs that constitute the PDCCH, or the aggregation level of the PDCCH is any one in set {1, 2, 4, 8, 16, 32}.

A search space is a set of candidate control channels. The search space may be classified into: a common search space and a UE-specific search space. The common search space is used to transmit related control information such as paging, RA response, and system information. The UE-specific search space is used for control information related to DL-SCH, UL-SCH, and the like. Certainly, the common search space may be also used to transmit control information belonging to specific UE. This is not limited in this embodiment of this application.

A time unit includes at least one time interval (TI) in time domain. The TI herein may be a transmission time interval (TTI) in an LTE system, may be a symbol-level short TTI, may be a short TTI of a large subcarrier spacing in a high-frequency system, or may be a slot, a mini-slot, or an OFDM symbol in a 5G system. This is not limited in this embodiment of this application.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of this embodiment of this application, unless otherwise stated, "a plurality of" means two or more than two. In this embodiment of this application, "a/an" means a single individual, and does not indicate that "a/an" can only be one individual and cannot be applied to another individual. For example, in this embodiment of this application, "a terminal device" refers to a particular terminal device, and this does not mean that "a terminal device" can be applied only to one particular terminal device. The terms "system" and "network" may be used interchangeably in this application. In this application, use of "an embodiment" (or "an implementation") or "embodiments" (or "implementations") means that a particular characteristic, structure, feature, and the like that are described together with an embodiment are included in at least one embodiment. Therefore, "in an embodiment" or "in the embodiments" that appears throughout this specification does not represent a same embodiment. Further, in this embodiment of this application, the terms "and/or" and "at least one" used in the cases of "A and/or B" and "at least one of A and B" include any one of three solutions: a solution in which A is included but B is excluded, a solution in which B is included but A is excluded, and a solution in which both options A and B are included. As another example, in the cases of "A, B, and/or C" and "at least one of A, B, and/or C", such terms include any one of six solutions: a solution in which A is included but B and C are excluded, a solution in which B is included but A and C are excluded, a solution in which C is included but A and B are excluded, a solution in which A and B are included but C is excluded, a solution in which B and C are included but A is excluded, a solution in which A and C are included but B is excluded, and a solution in which all the three options A, B and C are included. As easily understood by a person of ordinary skill in the art and a related art, all other similar descriptions can be understood in the foregoing manner in this embodiment of this application.

Currently, the access network device sends a control channel that carries control information. Correspondingly, the terminal device detects the control channel in a search space in a control resource set, to obtain related control information. The access network device or the terminal device determines the search space, and in one embodiment, determines a CCE number corresponding to at least one candidate control channel.

For a candidate control channel, an ECCE number corresponding to the candidate control channel may be determined by using the following formula (1).

$$L\left\{\left(Y_{p,t} + \left\lfloor \frac{m \times N_{CCE,p,t}}{L \times M_p^{(L)}} \right\rfloor + b\right) \bmod \left\lfloor \frac{N_{CCE,p,t}}{L} \right\rfloor\right\} + i \quad (1)$$

L represents an aggregation level of a candidate control channel i∈{0, 1, 2, 3, 4, . . . L−1}, and t is a number of a time unit. For example, in LTE, the time unit is a subframe. $N_{CCE,p,t}$ is a quantity of CCEs included in the control resource set. $M_p^{(L)}$ is a quantity of candidate control channels with an aggregation level of L in the control resource set, and m∈{0, 1, 2, 3, 4, . . . , $M_p^{(L)}$−1}. If a carrier indicator field (Carrier Indicator Field, CIF) value $n_{CI}$ is configured for the terminal device, b=$n_{CI}$; and if the CIF value is not configured for the terminal device, b=0.

$Y_{p,t}$=($A_p \times Y_{p,t-1}$)mod D, $Y_{p,k}$ is a parameter related to the control resource set p and t, and $A_p$ is a parameter corresponding to the control resource set p. $Y_{p,-1}$=$n_{NRTI}$≠0, $n_{NRTI}$ is a value of a radio network temporary identifier (RNTI) of the terminal device. In a current network, it is stipulated in a standard that the access network device configures two control resource sets at most for the terminal device, namely $p \in \{0,1\}$, $A_0=39827$, $A_1=39829$, and $D=65537$.

The following analyzes a reason why the foregoing parameters $A_0=39827$, $A_1=39829$, and $D=65537$ are not applicable to a future evolved network.

(1) In the current network, the access network device configures two control resource sets at most for the terminal device. In the future evolved network, the access network device may configure more than two control resource sets for the terminal. However, in the current network, $A_p$ has only two values (39827 and 39829). In this case, if there are more than two control resource sets, and the currently provided values of $A_p$ are still used, $A_p$ values corresponding to two of the control resource sets are definitely the same. If the $A_p$ values corresponding to two of the control resource sets are the same, for one terminal device, candidate control channels of the terminal device overlap in the two control resource sets, resulting in control channel congestion, and affecting normal control information receiving of the terminal device.

(2) In the current network, the radio network temporary identifier of the terminal device is a 16-bit sequence, and therefore $n_{NRTI} \in \{1, 2, 3, 4, \ldots, 65536\}$. However, in the future evolved network, the radio network temporary identifier of the terminal device may be a sequence with more than 16 bits, and therefore a value range of $n_{NRTI}$ is greater than 65536. In this case, if D is still equal to 65537, $Y_{p,k}$ of at least two terminal devices in a same control resource set is the same, and then in the same control resource set, candidate control channels of two terminal devices overlap, resulting in control channel congestion, and affecting normal control information receiving of the terminal device.

It can be learned that because an application scenario in the future evolved network is different from an application scenario in the current network, $A_0=39827$, $A_1=39829$, and $D=65537$ specified in the current network are not applicable to a search space determining process of the future evolved network.

An embodiment of this application provides a search space determining method of a wireless apparatus, which may be performed by the terminal device 101 or the access network device 102 shown in FIG. 1. The method includes the following steps or operations.

401. Obtain a second parameter, and a first parameter corresponding to a control resource set.

The first parameter is a positive integer not equal to 39827, 39829, and 65537, and the second parameter is equal to 65537 or is a prime number not equal to 65537.

In one embodiment, the first parameter is 39839.

In one embodiment, the first parameter is one element in a first set, and the first set includes at least one of {39798, 39805, 39806, 39807, 39808, 39813, 39815, 39816, 39819, 39821, 39824, 39828, 39830, 39832, 39839, 39840, 39842, 39850, 39853, 39854, 39855, 39856, 39858, 39859, 39735, 39736, 39740, 39743, 39745, 39748, 39753, 39755, 39756, 39757, 39759, 39761, 39764, 39765, 39768, 39771, 39775, 39777, 39779, 39780, 39782, 39783, 39784, 39786, 39787, 39789, 39790, 39791, 39794, 39674, 39675, 39676, 39681, 39683, 39684, 39685, 39686, 39688, 39689, 39690, 39692, 39693, 39695, 39697, 39700, 39701, 39704, 39707, 39708, 39709, 39712, 39713, 39714, 39716, 39718, 39720, 39722, 39723, 39725, 39727, 39730, 39731, 39733, 39618, 39625, 39627, 39628, 39630, 39631, 39632, 39633, 39636, 39637, 39642, 39644, 39647, 39648, 39650, 39651, 39652, 39654, 39655, 39656, 39657, 39658, 39659, 39660, 39664, 39666, 39667, 39671, 39672, 39673, 38317, 38329, 38371, 38393, 38447, 38461, 38543, 38557, 38561, 38603, 38609, 38611, 38629, 38639, 38651, 38677, 38693, 38707, 38711, 38713, 38737, 38747, 38803, 38821, 38861, 38873, 38933, 38953, 38959, 38971, 39041, 39043, 39079, 39107, 39133, 39139, 40193, 40231, 40289, 40343, 40357, 40361, 40429, 40493, 40583, 40597, 40609, 40693, 40697, 40709, 40771, 40801, 40813, 40819, 40823, 40841, 40847, 40849, 40853, 40867, 40879, 40897, 40903, 39157, 39163, 39181, 39199, 39209, 39217, 39229, 39239, 39241, 39301, 39317, 39323, 39343, 39383, 39409, 39419, 39451, 39499, 39509, 39541, 39563, 39569, 39581, 39631, 39659, 39667, 39671, 39709, 39727, 39733, 39761, 39779, 39791, 39821, 39839, 39863, 39887, 39901, 39971, 39979, 39983, 39989, 40087, 40093, 40123, 40127, 40129, 40153, 40169, 40177}.

Alternatively, the first parameter is a prime number that is not equal to 39827, 39829, and 65537. In addition, when the first parameter is a prime number that is not equal to 39827, 39829, and 65537, the first set includes at least one of {39671, 39709, 39727, 39733, 39761, 39779, 39791, 39821, 39839, 39863, 39887, 39901, 39971, 39979, 39983, 39989, 40087, 40093, 40123, 40127, 40129, 40153, 40169, 40177, 38317, 38329, 38371, 38393, 38447, 38461, 38543, 38557, 38561, 38603, 38609, 38611, 38629, 38639, 38651, 38677, 38693, 38707, 38711, 38713, 38737, 38747, 38803, 38821, 38861, 38873, 38933, 38953, 38959, 38971, 39041, 39043, 39079, 39107, 39133, 39139, 40193, 40231, 40289, 40343, 40357, 40361, 40429, 40493, 40583, 40597, 40609, 40693, 40697, 40709, 40771, 40801, 40813, 40819, 40823, 40841, 40847, 40849, 40853, 40867, 40879, 40897, 40903, 39157, 39163, 39181, 39199, 39209, 39217, 39229, 39239, 39241, 39301, 39317, 39323, 39343, 39383, 39409, 39419, 39451, 39499, 39509, 39541, 39563, 39569, 39581, 39631, 39659, 39667}.

The second parameter is one element in a second set, and the second set includes at least one of {524309, 524341, 524347, 524351, 524353, 524369, 524387, 524389, 524411, 524413, 524429, 524453, 524497, 524507, 524509, 524519, 524521, 524591, 524593, 524599, 524633, 524669, 524681, 524683, 524701, 262147, 262151, 262153, 262187, 262193, 262217, 262231, 262237, 262253, 262261, 262271, 262303, 262313, 262321, 262331, 262337, 262349, 262351, 262369, 262387, 262391, 262399, 262411, 262433, 262459, 131071, 131101, 131111, 131113, 131129, 131143, 131149, 131171, 131203, 131213, 131221, 131231, 131249, 131251, 131267, 131293, 131297, 131303, 131311, 131317, 131321, 131357, 131363, 131371, 131381, 1048583, 1048589, 1048601, 1048609, 1048613, 1048627, 1048633, 1048661, 1048681, 1048703, 1048709, 1048717, 1048721, 1048759, 1048783, 1048793, 1048799, 1048807, 1048829, 1048837, 1048847, 1048867, 1048877, 1048889, 1048891, 2097169, 2097211, 2097223, 2097229, 2097257, 2097259, 2097287, 2097289, 2097311, 2097317, 2097349, 2097373, 2097383, 2097397, 2097401, 2097421, 2097427, 2097449, 2097451, 2097461, 2097479, 2097481, 2097499, 2097503, 297517}.

The first parameter set or the second parameter set may be all or some of the elements included in the foregoing sets.

In one embodiment, a number of the control resource set is obtained, and then the first parameter is determined based on the number of the control resource set.

The control resource set is one of M control resource sets configured by the access network device for the terminal device, M is less than or equal to Q, and Q is a maximum quantity of control resource sets configurable for the terminal device. M and Q are both positive integers. For example, numbers of Q control resource sets may be indicated as {0, 1, 2, 3, 4, ..., Q–1}. Certainly, the numbers of the Q control resource sets may alternatively be implemented in another manner, which is not limited in this embodiment of this application. It may be understood that based on a size of an access bandwidth, a supported maximum quantity of bandwidth parts (BWP), or another parameter reported by the terminal device, the access network device determines a value of Q corresponding to the terminal device.

In actual application, when the method is applied to the terminal device, the terminal device receives radio resource control (RRC) signaling sent by the access network device, where the RRC signaling includes the number of the control resource set. When the method is applied to the access network device, the access network device determines the number of the control resource set based on an RNTI of the terminal device. Certainly, the access network device may alternatively use another method to determine the number of the control resource set. This is not limited in this embodiment of this application.

It should be noted that an action of sending the RRC signaling in this operation may be implemented by a transceiver 202 of the access network device 102, or certainly, may be implemented by the processor 201 of the access network device 102 by controlling the transceiver 202. An action of receiving the RRC signaling in this operation may be implemented by the transceiver 301 of the foregoing terminal device 101, or certainly, may be implemented by the modem processor 304 of the terminal device 101 by controlling the transceiver 301.

After the number of the control resource set is obtained, the first parameter corresponding to the number of the control resource set is determined based on a first preset correspondence.

In one embodiment of the first preset correspondence, the first preset correspondence includes the number of the control resource set and the first parameter corresponding to the number of the control resource set. For example, the first preset correspondence may be indicated in Table 1.

TABLE 1

| Number of a control resource set | First parameter |
| --- | --- |
| 0 | 39839 |
| 1 | 39863 |
| 2 | 39887 |
| 3 | 39901 |
| 4 | 39971 |
| 5 | 39979 |
| 6 | 39983 |
| 7 | 39989 |
| 8 | 40087 |
| 9 | 40093 |

In one embodiment of the first preset correspondence, the first preset correspondence includes the number of the control resource set, and the second parameter and the first parameter corresponding to the number of the control resource set. For example, the first preset correspondence may be indicated in Table 2.

TABLE 2

| Second parameter | Number of a control resource set | First parameter |
| --- | --- | --- |
| D1 = 65537 | 0 | 39839 |
| | 1 | 39863 |
| D2 = 2097169 | 0 | 39989 |
| | 1 | 40093 |

In one embodiment, the number of the control resource set is obtained, and then the second parameter is determined based on the number of the control resource set. After the number of the control resource set is obtained, the second parameter corresponding to the number of the control resource set is determined based on a second preset correspondence. The second preset correspondence includes the number of the control resource set and the second parameter corresponding to the number of the control resource set. For example, the second preset correspondence may be indicated in Table 3.

TABLE 3

| Number of a control resource set | Second parameter |
| --- | --- |
| 0 | 65537 |
| 1 | 524309 |
| 2 | 262147 |
| 4 | 131071 |
| 5 | 1048583 |
| 6 | 2097169 |

In one embodiment, the terminal device obtains an element A' in the first set and obtains the first parameter based on a value of A'. The value of A' may be predefined in a standard.

In one embodiment, the first parameter is one element in the first set. The first parameter meets a relationship shown in formula (2):

$$A = (A'^q) \bmod D \quad (2)$$

where A represents the first parameter, D represents the second parameter, A' represents the third parameter, and q is an integer that is mutually prime to D−1. The third parameter may be a value predefined in the standard.

In one embodiment, the terminal device obtains A' and obtains the first parameter based on the value of A'.

For example, A'=39827 and D=65537 are predefined in the standard, and the terminal device obtains the first parameter based on a relationship between the first parameter A and A'. D−1=65536, and a value that is mutually prime to 65536 includes one value in the following value (set: {1, 3, 5, 7, 9}. Then, the first parameter A=39827³)mod 65537=50028, where A is one element in the first set.

In one embodiment, the terminal device obtains the number p of the control resource set and a predefined parameter A', and obtains the first parameter corresponding to the number p of the control resource set based on the value of A'.

For example, A'=39827 and D=65537 are predefined in the standard. The terminal device obtains the number p of the control resource set, where the number p is a value in a set {1, 2, 3}, and the first parameter may be obtained based on the following relationship:

$$A = (A'^q) \bmod D \quad (3)$$

where q=2^p+1. In one embodiment, for a control resource set with a number p=1, the corresponding first parameter A=(39827³)mod 65537=50028. Similarly, when p is another value, the first parameter may be obtained based on formula (3).

402. Determine a search space of the control resource set based on the first parameter and the second parameter.

In one embodiment, the search space corresponding to the control resource set is determined based on the following formula (4):

$$Y_k = (A * Y_{k-1}) \bmod D \quad (4)$$

where k represents a number of a time unit, $Y_k$ represents a variable corresponding to the time unit k, $Y_{k-1}$ represents a variable corresponding to a time unit k−1, A represents the first parameter, and D represents the second parameter.

It should be noted that, for A and D in the foregoing formula, a correspondence between A/D and the first parameter/the second parameter is not limited in this embodiment of this application. For example, when the second parameter is equal to 65537, the second parameter may be indicated as A.

It should be noted that formula (4) may be transformed into formula (5):

$$Y_k = (A^{k+1} * Y_{-1}) \bmod D \quad (5)$$

where $Y_{-1} = n_{RNTI} \neq 0$, and $n_{RNTI}$ is a value of the RNTI of the terminal device.

For example, when A=39839, D=65537, and $n_{RNTI}$=1, a value range of $Y_k$ is a set {39839, 36392, 11374, 5968, 56453, 63375, 48237, 30433, 51324, 7973}.

For example, when A=39839, D=65537, and $n_{RNTI}$=2, a value range of $Y_k$ is a set {14141, 7247, 22748, 11936, 47369, 61213, 32937, 60866, 37111, 15946}.

In addition, in formula (4), if A is not a primitive root of D, periodicity of $(A*Y_{k-1}) \bmod D$ is less than D, and in one embodiment, a quantity of values of $Y_k$ is less than D. For example, in a current network, when A=39829, D=65537, and $n_{NRTI} \in \{1, 2, 3, 4, \ldots 65536\}$, the values of $Y_k$ include only 32768 different values. In this case, $Y_{p,k}$ of two terminal devices in a same control resource set may be the same, and then in the same control resource set, candidate control channels of the two terminal devices overlap, resulting in control channel congestion. Therefore, to reduce a probability of control channel congestion, A is the primitive root of D.

It should be noted that an action of determining the search space in this operation may be implemented by the processor 201 of the access network device 102. Alternatively, the action of determining the search space in this operation may be implemented by the modem processor 304 of the terminal device 101.

In one embodiment, when the method is applied to the access network device, after the search space is determined based on operation 402, the access network device sends control information on one or more candidate control channels in the search space, where the control information may be used for uplink and downlink resource allocation, power control, and the like for the terminal device. In a 5G system, the control information is downlink control information. Correspondingly, after determining the search space of the control resource set, the terminal device detects at least one candidate control channel in the search space to obtain the control information. For implementation of the process, refer to the prior art. Details are not described herein.

In one embodiment, when the method is applied to the terminal device, the terminal device detects at least one candidate control channel in the search space determined based on operation 402 to obtain the control information. For implementation of the process, refer to the prior art. Details are not described herein.

Figure 4A:
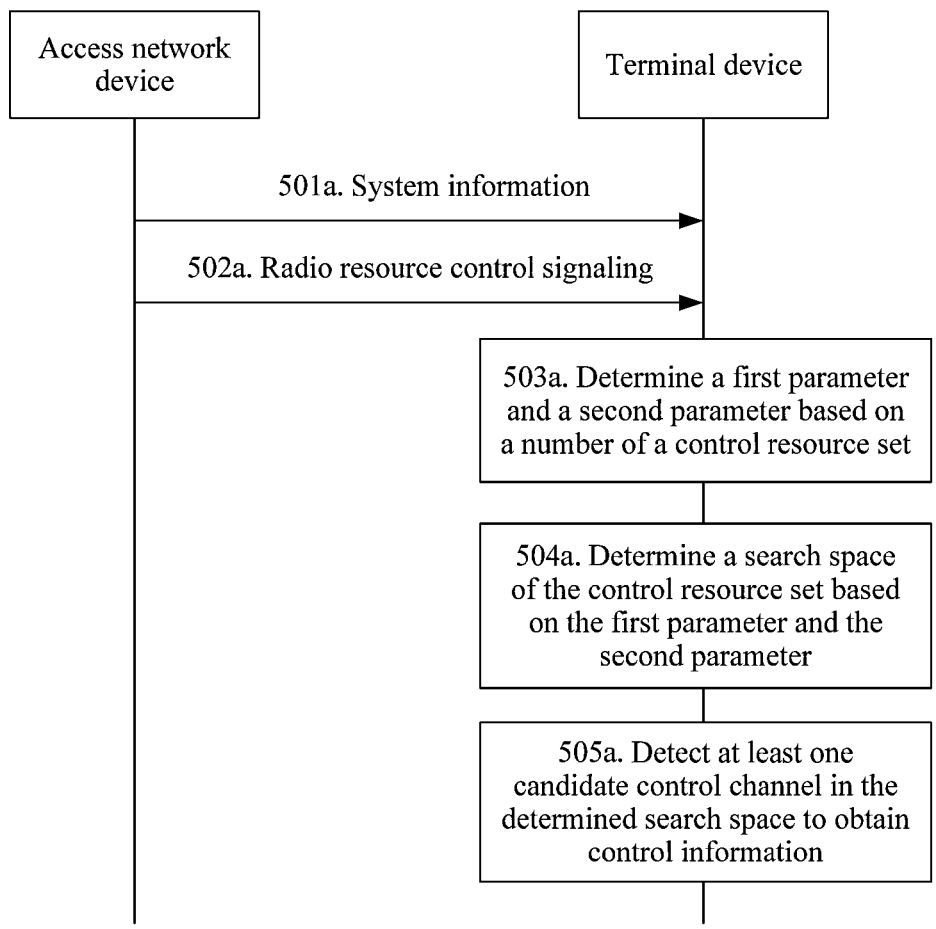
FIG. 4A is an example of a flowchart of a search space determining method according to an embodiment of this application.

To describe the search space determining method of the wireless apparatus more clearly, that the wireless apparatus is a terminal device is used as an example for description. As shown in FIG. 4A, the search space determining method provided in this embodiment of this application may be implemented as the following operations 501a to 505a.

501a. An access network device sends a system message to the terminal device.

The system information is used to indicate Q.

Correspondingly, the terminal device receives the system information sent by the access network device. In this way, based on Q indicated by the system information, the terminal device may verify whether an obtained number of the control resource set is correct.

502a. The access network device sends RRC signaling to the terminal device.

The RRC signaling includes the number of the control resource set.

Correspondingly, the terminal device can obtain the number of the control resource set by receiving radio resource control signaling.

503a. The terminal device determines a first parameter and a second parameter based on the number of the control resource set.

In one embodiment, for an implementation process of operation 503a, refer to operation 401. Details are not described herein.

504a. The terminal device determines a search space of the control resource set based on the first parameter and the second parameter.

In one embodiment, for an implementation process of operation 504a, refer to operation 401. Details are not described herein.

505a. The terminal device detects at least one candidate control channel in the determined search space to obtain control information.

Figure 4B:
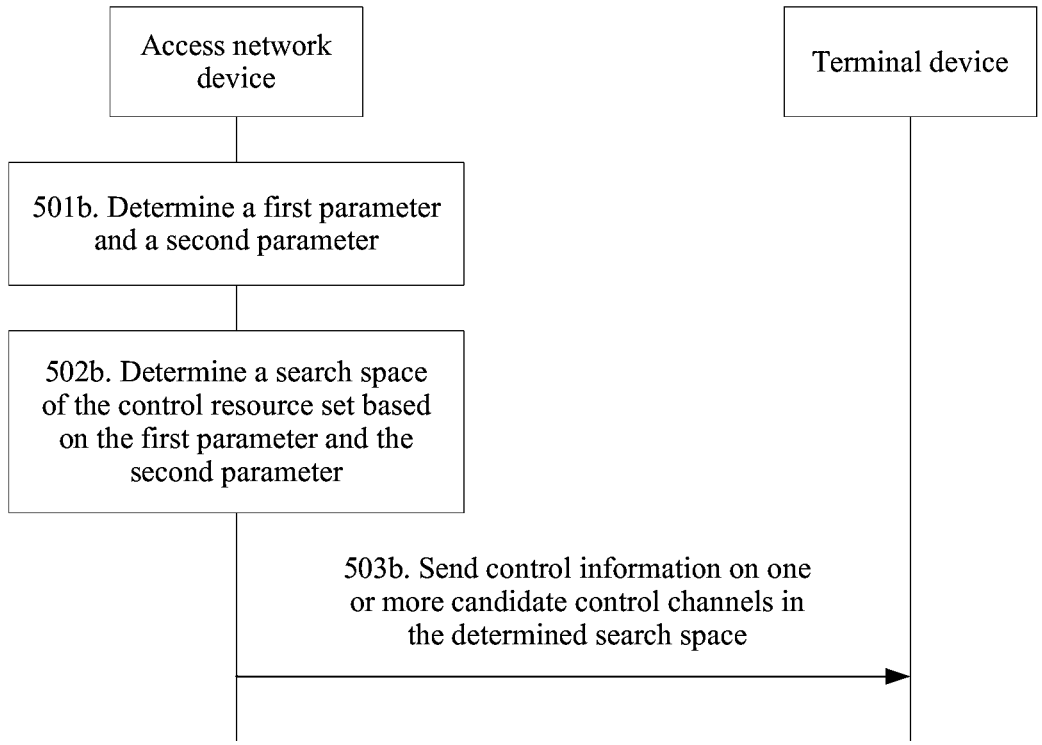
FIG. 4B is an example of a flowchart of a search space determining method according to an embodiment of this application.

To describe the search space determining method of the wireless apparatus more clearly, that the wireless apparatus is an access network device is used as an example for description. As shown in FIG. 4B, the search space determining method provided in this embodiment of this application may be implemented as the following operations 501b to 503b.

501b. The access network device determines a first parameter and a second parameter.

In one embodiment, for an implementation process of operation 501b, refer to operation 401. Details are not described herein.

502b. The access network device determines a search space of a control resource set based on the first parameter and the second parameter.

In one embodiment, for an implementation process of operation 502b, refer to operation 402. Details are not described herein.

503b. The access network device sends control information on one or more candidate control channels in the determined search space.

It may be understood that to implement the foregoing functions, the access network device and the terminal device include corresponding hardware structures and/or software modules for implementing the functions. With reference to the units and algorithm steps and operations described in the embodiments disclosed in this application, embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In this embodiment of this application, function units of the access network device, the terminal device, and the like may be divided based on the foregoing method examples.

For example, each function unit may be obtained through division based on a corresponding function, or two or more functions may be integrated into one processing unit. The integrated unit may be implemented in a form of hardware, or may be implemented in a form of a software functional unit. It should be noted that, in this embodiment of this application, unit division is an example, and is merely a logical function division. In actual implementation, another division manner may be used.

Figure 5:
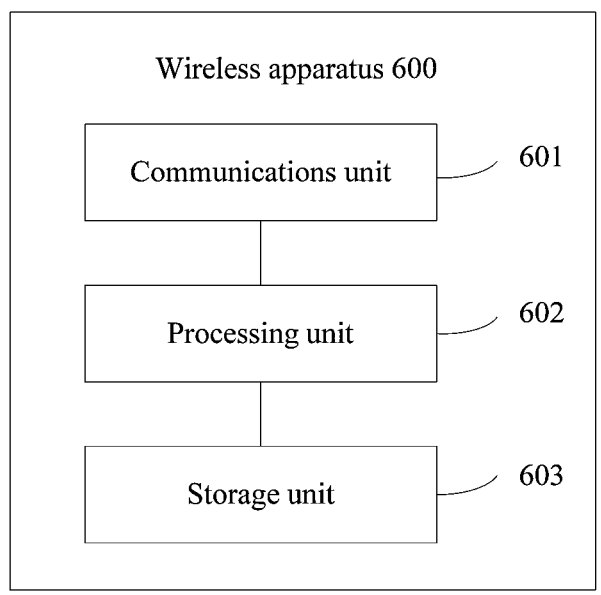
FIG. 5 is a schematic structural diagram of a wireless apparatus according to an embodiment of this application.

FIG. 5 is a schematic structural diagram of a wireless apparatus in the foregoing embodiment. The wireless apparatus 600 includes: a communications unit 601 and a processing unit 602. The communications unit 601 is configured to implement operations 501a and 502a shown in FIG. 4A, operation 503b shown in FIG. 4B, and/or other processes of the technologies described in this specification. The processing unit 602 is configured to implement operations 503a, 504a and 505a shown in FIG. 4A, operations 501b and 502b shown in FIG. 4B, and/or other processes of the technologies described in this specification. The communications unit 601 is further configured to support communication between the wireless apparatus 600 and another device. The wireless apparatus 600 further includes: a storage unit 603, configured to store program code and data of the wireless apparatus.

Method or algorithm steps or operations described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the wireless apparatus. Certainly, the processor and the storage medium may exist in the wireless apparatus as discrete components.

A person skilled in the art should be aware that in the foregoing one or more examples, functions described in this application may be implemented by hardware, software, firmware, or any combination thereof. When the embodiments of the invention are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A search space determining method comprising:
   obtaining a second parameter and a first parameter corresponding to a control resource set, wherein the first parameter is one element in a first set, and the second parameter is equal to 65537 or is a prime number not equal to 65537; and
   the first set includes at least one of {39798, 39805, 39806, 39807, 39808, 39813, 39815, 39816, 39819, 39824, 39828, 39830, 39832, 39840, 39842, 39850, 39853, 39854, 39855, 39856, 39858, 39859, 39735, 39736, 39740, 39743, 39745, 39748, 39753, 39755, 39756, 39757, 39759, 39764, 39765, 39768, 39771, 39775, 39777, 39780, 39782, 39783, 39784, 39786, 39787, 39789, 39790, 39794, 39674, 39675, 39676, 39681, 39683, 39684, 39685, 39686, 39688, 39689, 39690, 39692, 39693, 39695, 39697, 39700, 39701, 39704, 39707, 39708, 39712, 39713, 39714, 39716, 39718, 39720, 39722, 39723, 39725, 39730, 39731, 39618, 39625, 39627, 39628, 39630, 39631, 39632, 39633, 39636, 39637, 39642, 39644, 39647, 39648, 39650, 39651, 39652, 39654, 39655, 39656, 39657, 39658, 39659, 39660, 39664, 39666, 39667, 39672, 39673, 38317, 38329, 38371, 38393, 38447, 38461, 38543, 38557, 38561, 38603, 38609, 38611, 38629, 38639, 38651, 38677, 38693, 38707, 38711, 38713, 38737, 38747, 38803, 38821, 38861, 38873, 38933, 38953, 38959, 38971, 39041, 39043, 39079, 39107, 39133, 39139, 40193, 40231, 40289, 40343, 40357, 40361, 40429, 40493, 40583, 40597, 40609, 40693, 40697, 40709, 40771, 40801, 40813, 40819, 40823, 40841, 40847, 40849, 40853, 40867, 40879, 40897, 40903, 39157, 39163, 39181, 39199, 39209, 39217, 39229, 39239, 39241, 39301, 39317, 39323, 39343, 39383, 39409, 39419, 39451, 39499, 39509, 39541, 39563, 39569, 39581, 39631, 39659, 39667, 39709, 39727, 39733, 39761, 39779, 39791, 39821, 39839, 40087, 40093, 40123, 40127, 40129, 40153, 40169, 40177};
   determining a search space of the control resource set based on the first parameter and the second parameter.

2. The search space determining method according to claim 1, further comprising:
   obtaining a number of the control resource set; and
   wherein, the obtaining a first parameter corresponding to a control resource set comprises:
   determining the first parameter based on the number of the control resource set.

3. The search space determining method according to claim 2, wherein the determining the first parameter based on the number of the control resource set comprises:
   determining, based on a correspondence between the number of the control resource set and the first parameter, the first parameter corresponding to the number of the control resource set.

4. The search space determining method according to claim 1, wherein the first parameter is one element in the first set, and the first set further comprises a third parameter;
   wherein, the first parameter meets the following relationship:

$A = (A'^q) \bmod D;$ wherein A represents the first parameter, D represents the second parameter, A' represents the third parameter, and q is an integer that is mutually prime to D−1.

5. The search space determining method according claim 1, wherein the determining a search space of the control resource set based on the first parameter and the second parameter comprises:
  determining, based on a formula $Y_k=(A*Y_{k-1}) \bmod D$, the search space corresponding to the control resource set;
  wherein k represents a number of a time unit, $Y_k$ represents a variable corresponding to the time unit k, $Y_{k-1}$ represents a variable corresponding to a time unit k−1, A represents the first parameter, and D represents the second parameter.

6. The search space determining method according claim 1, wherein the control resource set is one of M control resource sets configured for a terminal device, M is less than or equal to Q, and Q is a maximum quantity of control resource sets configurable for the terminal device.

7. The search space determining method according to claim 6, further comprising:
  receiving system information, wherein the system information is used to indicate Q.

8. The search space determining method according to claim 6, further comprising:
  sending system information, wherein the system information is used to indicate Q.

9. A wireless apparatus comprising:
  a processor; and
  a memory coupled to the processor, wherein
  the processor is configured to obtain a second parameter, and a first parameter corresponding to a control resource set, wherein the first parameter is one element in a first set, and the second parameter is equal to 65537 or is a prime number not equal to 65537; and
  the first set includes at least one of {39798, 39805, 39806, 39807, 39808, 39813, 39815, 39816, 39819, 39824, 39828, 39830, 39832, 39840, 39842, 39850, 39853, 39854, 39855, 39856, 39858, 39859, 39735, 39736, 39740, 39743, 39745, 39748, 39753, 39755, 39756, 39757, 39759, 39764, 39765, 39768, 39771, 39775, 39777, 39780, 39782, 39783, 39784, 39786, 39787, 39789, 39790, 39794, 39674, 39675, 39676, 39681, 39683, 39684, 39685, 39686, 39688, 39689, 39690, 39692, 39693, 39695, 39697, 39700, 39701, 39704, 39707, 39708, 39712, 39713, 39714, 39716, 39718, 39720, 39722, 39723, 39725, 39730, 39731, 39618, 39625, 39627, 39628, 39630, 39631, 39632, 39633, 39636, 39637, 39642, 39644, 39647, 39648, 39650, 39651, 39652, 39654, 39655, 39656, 39657, 39658, 39659, 39660, 39664, 39666, 39667, 39672, 39673, 38317, 38329, 38371, 38393, 38447, 38461, 38543, 38557, 38561, 38603, 38609, 38611, 38629, 38639, 38651, 38677, 38693, 38707, 38711, 38713, 38737, 38747, 38803, 38821, 38861, 38873, 38933, 38953, 38959, 38971, 39041, 39043, 39079, 39107, 39133, 39139, 40193, 40231, 40289, 40343, 40357, 40361, 40429, 40493, 40583, 40597, 40609, 40693, 40697, 40709, 40771, 40801, 40813, 40819, 40823, 40841, 40847, 40849, 40853, 40867, 40879, 40897, 40903, 39157, 39163, 39181, 39199, 39209, 39217, 39229, 39239, 39241, 39301, 39317, 39323, 39343, 39383, 39409, 39419, 39451, 39499, 39509, 39541, 39563, 39569, 39581, 39631, 39659, 39667, 39709, 39727, 39733, 39761, 39779, 39791, 39821, 39839, 40087, 40093, 40123, 40127, 40153, 40169, 40177};
  the processor is further configured to determine a search space of the control resource set based on the first parameter and the second parameter.

10. The wireless apparatus according to claim 9, wherein the processor is further configured to obtain a number of the control resource set; and
  the processor is configured to obtain the first parameter corresponding to the control resource set by: determining, based on the number of the control resource set, the first parameter corresponding to the control resource set.

11. The wireless apparatus according to claim 10, wherein the processor is configured to determine, based on the number of the control resource set, the first parameter corresponding to the control resource set by:
  determining, based on a correspondence between the number of the control resource set and the first parameter, the first parameter corresponding to the number of the control resource set.

12. The wireless apparatus according claim 9, wherein the first parameter is one element in the first set, and the first set further comprises a third parameter; and
  wherein, the first parameter meets the following relationship:
  $A=(A'^q) \bmod D;$
  wherein A represents the first parameter, D represents the second parameter, A' represents the third parameter, and q is an integer that is mutually prime to D−1.

13. The wireless apparatus according to claim 9, wherein the processor is configured to determine the search space of the control resource set based on the first parameter and the second parameter by:
  determining, based on a formula $Y_k=(A*Y_{k-1}) \bmod D$, the search space corresponding to the control resource set;
  wherein k represents a number of a time unit, $Y_k$ represents a variable corresponding to the time unit k, $Y_{k-1}$ represents a variable corresponding to a time unit k−1, A represents the first parameter, and D represents the second parameter.

14. The wireless apparatus according to claim 9, wherein the control resource set is one of M control resource sets configured for a terminal device, M is less than or equal to Q, and Q is a maximum quantity of control resource sets configurable for the terminal device.

15. A non-transitory computer-readable medium having instructions stored therein, which when executed by a processor, causes the processor to perform operations comprising:
  obtaining a second parameter and a first parameter corresponding to a control resource set, wherein the first parameter is one element in a first set, and the second parameter is equal to 65537 or is a prime number not equal to 65537; and
  the first set includes at least one of {39798, 39805, 39806, 39807, 39808, 39813, 39815, 39816, 39819, 39824, 39828, 39830, 39832, 39840, 39842, 39850, 39853, 39854, 39855, 39856, 39858, 39859, 39735, 39736, 39740, 39743, 39745, 39748, 39753, 39755, 39756, 39757, 39759, 39764, 39765, 39768, 39771, 39775, 39777, 39780, 39782, 39783, 39784, 39786, 39787, 39789, 39790, 39794, 39674, 39675, 39676, 39681, 39683, 39684, 39685, 39686, 39688, 39689, 39690, 39692, 39693, 39695, 39697, 39700, 39701, 39704, 39707, 39708, 39712, 39713, 39714, 39716, 39718, 39720, 39722, 39723, 39725, 39730, 39731, 39618, 39625, 39627, 39628, 39630, 39631, 39632, 39633, 39636, 39637, 39642, 39644, 39647, 39648, 39650, 39651, 39652, 39654, 39655, 39656, 39657, 39658, 39659, 39660, 39664, 39666, 39667, 39672, 39673, 38317, 38329, 38371, 38393, 38447, 38461, 38543, 38557, 38561, 38603, 38609, 38611, 38629, 38639, 38651, 38677, 38693, 38707, 38711, 38713, 38737, 38747, 38803, 38821, 38861, 38873, 38933, 38953, 38959, 38971, 39041, 39043, 39079, 39107, 39133, 39139, 40193, 40231, 40289, 40343, 40357, 40361, 40429, 40493, 40583, 40597, 40609, 40693, 40697, 40709, 40771, 40801, 40813, 40819, 40823, 40841, 40847, 40849, 40853, 40867, 40879, 40897, 40903, 39157, 39163, 39181, 39199, 39209, 39217, 39229, 39239, 39241, 39301, 39317, 39323, 39343, 39383, 39409, 39419, 39451, 39499, 39509, 39541, 39563, 39569, 39581, 39631, 39659, 39667, 39709, 39727, 39733, 39761, 39779, 39791, 39821, 39839, 40087, 40093, 40123, 40127, 40129, 40153, 40169, 40177};

determining a search space of the control resource set based on the first parameter and the second parameter.

16. The computer-readable medium according to claim 15, wherein the operations further comprise:

obtaining a number of the control resource set; and wherein, the obtaining a first parameter corresponding to a control resource set comprises:

determining the first parameter based on the number of the control resource set.

17. The computer-readable medium according to claim 16, wherein the determining the first parameter based on the number of the control resource set comprises:

determining, based on a correspondence between the number of the control resource set and the first parameter, the first parameter corresponding to the number of the control resource set.

18. The computer-readable medium according to claim 15, wherein the first parameter is one element in the first set, and the first set further comprises a third parameter;

wherein, the first parameter meets the following relationship:

$$A = (A'^q) \bmod D;$$

wherein A represents the first parameter, D represents the second parameter, A' represents the third parameter, and q is an integer that is mutually prime to D−1.

19. The computer-readable medium according to claim 15, wherein the determining a search space of the control resource set based on the first parameter and the second parameter comprises:

determining, based on a formula $Y_k = (A * Y_{k-1}) \bmod D$, the search space corresponding to the control resource set;

wherein k represents a number of a time unit, $Y_k$ represents a variable corresponding to the time unit k, $Y_{k-1}$ represents a variable corresponding to a time unit k−1, A represents the first parameter, and D represents the second parameter.

20. The computer-readable medium according to claim 15, wherein the control resource set is one of M control resource sets configured for a terminal device, M is less than or equal to Q, and Q is a maximum quantity of control resource sets configurable for the terminal device.

* * * * *